(12) United States Patent
Grossman et al.

(10) Patent No.: US 7,310,919 B2
(45) Date of Patent: Dec. 25, 2007

(54) GRAIN BIN FLOORING SYSTEM

(75) Inventors: Rodney B. Grossman, Goshen, IN (US); Harmon L. Towne, Louden, TN (US); Kevin L. Milliman, Fort Wayne, IN (US); Mark Dingeldein, Milford, IN (US)

(73) Assignee: CTB IP, Inc., Wilmington, DE (US)

( * ) Notice: Subject to any disclaimer, the term of this patent is extended or adjusted under 35 U.S.C. 154(b) by 0 days.

(21) Appl. No.: 10/396,096

(22) Filed: Mar. 25, 2003

(65) Prior Publication Data

US 2004/0187416 A1 Sep. 30, 2004

(51) Int. Cl.
*E04H 7/22* (2006.01)
*E04B 5/00* (2006.01)

(52) U.S. Cl. .......................... 52/302.2; 52/263; 52/537

(58) Field of Classification Search ............... 52/302.2, 52/529, 537, 263, 177, 630
See application file for complete search history.

(56) References Cited

U.S. PATENT DOCUMENTS

| | | | |
|---|---|---|---|
| 246,388 A | 8/1881 | Hayner | |
| 965,366 A | 7/1910 | Bradley | |
| 1,193,857 A | 8/1916 | Atwood | |
| 1,420,775 A | 6/1922 | Stanwood | |
| 1,784,368 A * | 12/1930 | Loucks | 52/519 |
| 2,180,317 A | 11/1939 | Davis | |
| 2,281,822 A | 5/1942 | Bills et al. | |
| 2,336,713 A | 12/1943 | Bunker | |
| 2,405,584 A * | 8/1946 | Lewis | 52/92.3 |
| 2,818,009 A | 12/1957 | Steffen | |
| 3,043,407 A * | 7/1962 | Marryatt | 52/588.1 |
| 3,046,852 A * | 7/1962 | Graham | 52/581 |
| 3,049,198 A | 8/1962 | Dobbins et al. | |
| 3,283,459 A | 11/1966 | Beranek et al. | |
| 3,392,500 A * | 7/1968 | Johnston | 52/783.15 |
| 3,426,445 A | 2/1969 | Steffen | |
| 3,512,321 A | 5/1970 | Boatner | |
| 3,512,322 A | 5/1970 | Steffen | |
| 3,555,762 A * | 1/1971 | Costanzo, Jr. et al. | 52/588.1 |
| 3,591,994 A | 7/1971 | Steffen | |
| 3,760,549 A * | 9/1973 | Silberkuhl et al. | 52/630 |
| 3,792,560 A | 2/1974 | Naylor | |
| 3,813,839 A | 6/1974 | Simpson, Jr. et al. | |
| 3,844,085 A * | 10/1974 | Marchello | 52/731.5 |
| D246,388 S | 11/1977 | Shivvers | |

(Continued)

FOREIGN PATENT DOCUMENTS

BE 876329 A * 9/1979

*Primary Examiner*—Sarah B McPartlin
(74) *Attorney, Agent, or Firm*—Harness, Dickey & Pierce, P.L.C.

(57) ABSTRACT

A grain bin floor panel formed from sheet metal. The grain bin floor panel is comprised of a first flange, a second flange, and a center support disposed between the first flange and the second flange. The center support is connected to the first flange by a first support surface and the second flange by a second support surface. To insure that the first and second support surfaces do not become separated from one another, the center support is configured with at least one staking. To provide the floor panel added strength, the first flange, the second flange, the center support, and the first and second support surfaces are preferably corrugated. To further increase the strength of the center support, the center support is preferably shaped as a triangle.

29 Claims, 3 Drawing Sheets

U.S. PATENT DOCUMENTS

| | | |
|---|---|---|
| 4,073,110 A | 2/1978 | Kennedy |
| 4,114,324 A | 9/1978 | Link et al. |
| 4,137,682 A | 2/1979 | Trumper |
| 4,198,795 A * | 4/1980 | Barnidge ............... 52/180 |
| D258,465 S | 3/1981 | Studinski |
| 4,282,694 A | 8/1981 | Mead |
| RE31,368 E | 9/1983 | Trumper |
| 4,418,558 A | 12/1983 | Simmons |
| 4,453,364 A * | 6/1984 | Ting ...................... 52/630 |
| 4,468,910 A | 9/1984 | Morrison |
| 4,502,369 A | 3/1985 | Aldag |
| 4,538,364 A | 9/1985 | Jensen |
| 4,557,086 A | 12/1985 | Liefer et al. |
| 4,587,893 A | 5/1986 | Brockhaus et al. |
| 4,589,332 A | 5/1986 | Brockhaus et al. |
| 4,599,809 A | 7/1986 | Parkes |
| 4,604,842 A | 8/1986 | Sukup |
| 4,619,085 A | 10/1986 | Carroll et al. |
| 4,675,238 A * | 6/1987 | Karoubas ................ 428/599 |
| 4,709,519 A | 12/1987 | Liefer et al. |
| 4,750,273 A | 6/1988 | Parkes et al. |
| 4,841,701 A | 6/1989 | Sukup |
| 4,882,889 A * | 11/1989 | Healy et al. ............. 52/336 |
| RE33,358 E | 10/1990 | Sukup |
| 4,993,881 A * | 2/1991 | Person .................... 406/88 |
| 5,009,045 A * | 4/1991 | Yoder ..................... 52/177 |
| 5,107,644 A | 4/1992 | Hanig et al. |
| 5,287,671 A * | 2/1994 | Ueki ...................... 52/588.1 |
| 5,417,028 A * | 5/1995 | Meyer .................... 52/737.6 |
| 5,833,386 A | 11/1998 | Rosan et al. |
| 6,167,601 B1 * | 1/2001 | Gollhofer et al. ......... 29/6.1 |

* cited by examiner

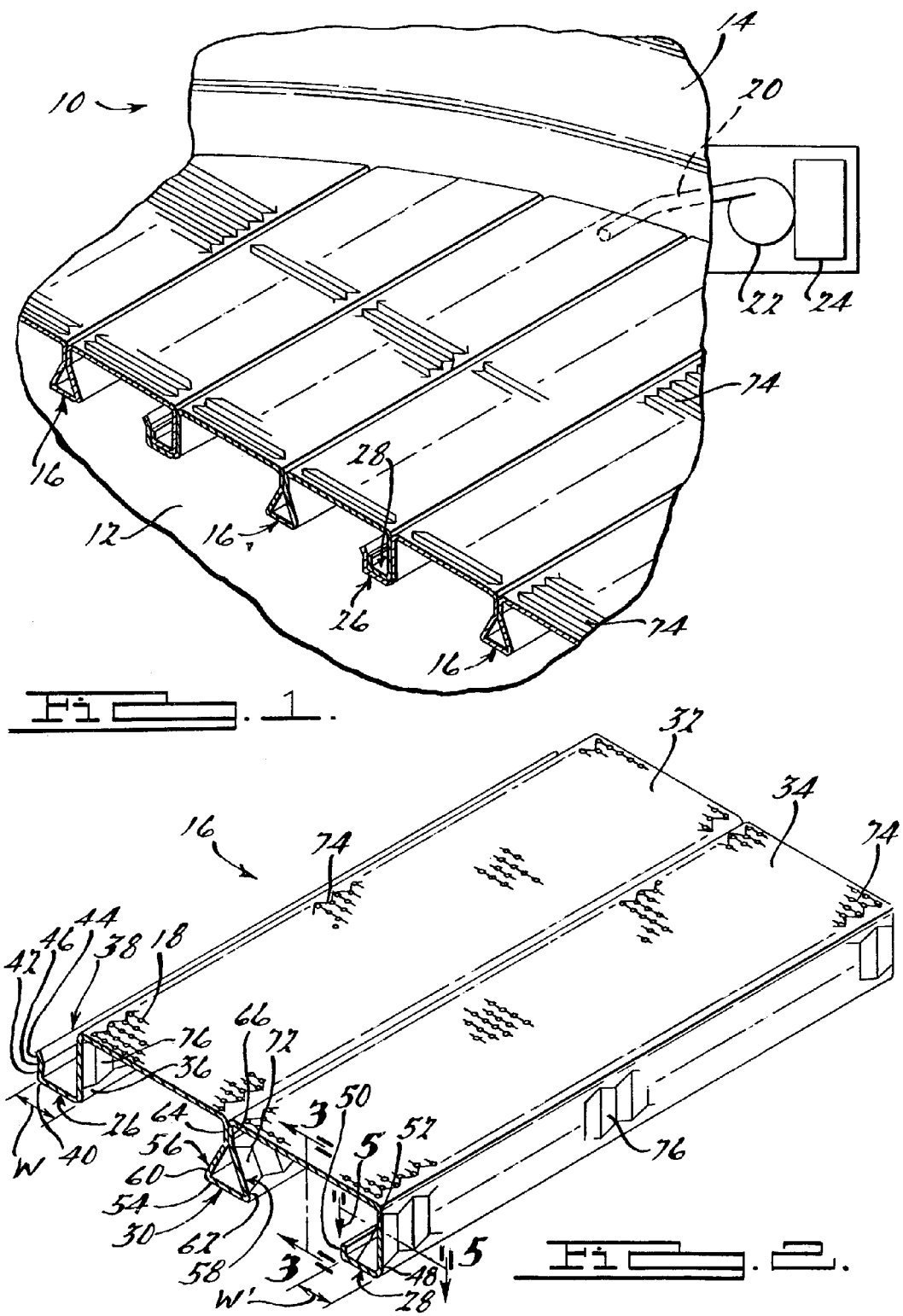

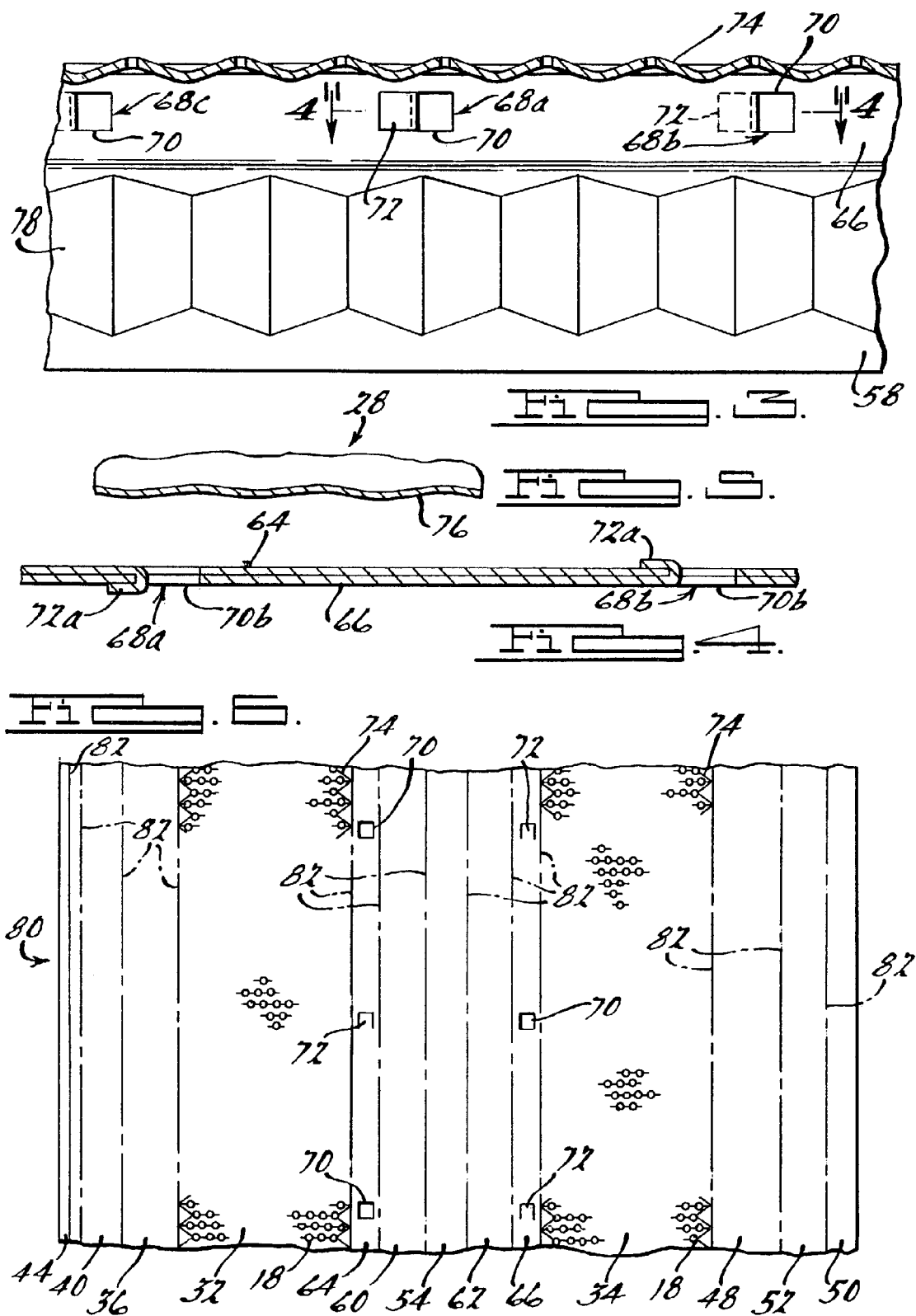

GRAIN BIN FLOORING SYSTEM

FIELD OF THE INVENTION

The present invention generally relates to grain bin flooring systems. In particular, the present invention relates to processed sheet metal used in grain bins as a false floor above one or more plenums.

BACKGROUND OF THE INVENTION

Grain storage bins often include a false floor that is supported above a base of the storage bin. The elevated false floor creates a plenum between the false floor and the base of the storage bin. The false floor includes a series of perforations that permit heated or ambient air located within the plenum to pass through the false floor and into contact with grain supported by the false floor. Circulation of the air through the grain serves many functions, such as drying or otherwise conditioning the grain to prevent the grain from spoiling.

Conventionally, the false floor is comprised of a series of longitudinal panels cut to desired lengths and placed side-by-side to substantially cover the entire floor area of the grain storage bin. The floor panels commonly have male and female flanges of generally U-shaped cross sections along opposite edges of the panel so that the male flange of one panel section can be interlocked with the female flange of an adjacent floor panel section. One floor panel design has included a center support located between the male and female flanges to provide additional support to the floor panels. Each floor panel is made from a single piece of sheet metal. The two flanges and the center support are formed by properly bending and folding the sheet metal during manufacturing.

While conventional grain bin floor panels are suitable for their intended use, they are subject to improvement. For example, there is a need for an enhanced floor panel having a pair of strengthened flanges, a strengthened center support, a strengthened and more durable grain support surface, and/or an overall design that permits the stacking of multiple floor panels in a compact, space saving manner.

SUMMARY OF THE INVENTION

The present invention provides for a grain bin floor panel formed from sheet metal. The grain bin floor panel is comprised of a first support member, a second support member, and a center support disposed between the first support member and the second support member. The center support is connected to the first support member by a first support surface and to the second support member by a second support surface. The center support is preferably configured with at least one interlocking member to secure various portions of the center support together. This can help insure, for example, that the first and second support surfaces do not become separated from one another. To provide the floor panel with added strength, for example, at least a portion of either the first flange, the second flange, and the center support are preferably corrugated. The center support preferably includes a triangle shape which can also provide additional strength.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a partial perspective view of a plurality of floor panels according to the present invention, the floor panels being placed within a grain bin in an interlocking relationship;

FIG. 2 is a perspective view of one of the floor panels of FIG. 1;

FIG. 3 is a side sectional view of the floor panel of FIG. 2, taken along line 3-3 of FIG. 2;

FIG. 4 is a top sectional view of the floor panel of FIG. 3 taken along line 4-4 of FIG. 3;

FIG. 5 is a top sectional view of the floor panel of FIG. 2 taken along line 5-5 of FIG. 2;

FIG. 6 is a partial plan view of a piece of sheet metal used to form the floor panel of FIG. 2.

DETAILED DESCRIPTION OF THE PREFERRED EMBODIMENTS

Figure 7:
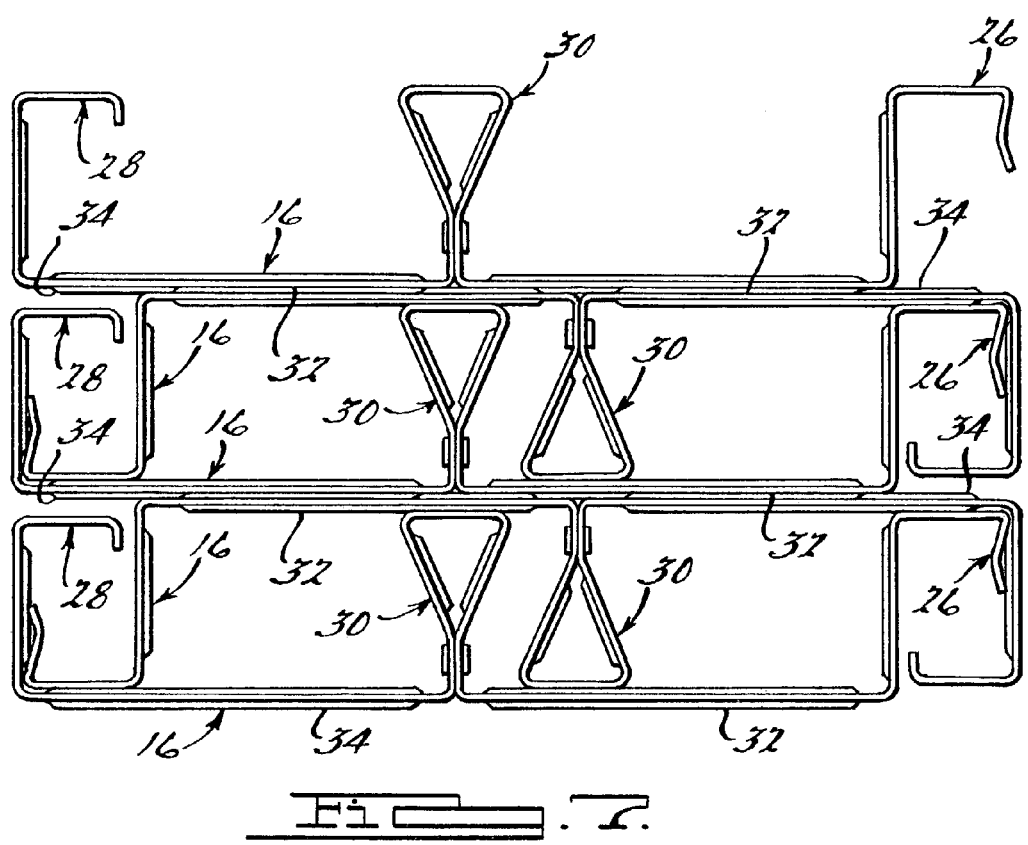
FIG. 7 is a side view of a plurality of the floor panels of FIG. 2 arranged in a stacked relationship.

The following description of the preferred embodiments is merely exemplary in nature and is in no way intended to limit the invention, its application, or uses.

FIG. 1 illustrates a grain bin 10 having a base floor 12 and a sidewall 14. The base floor 12 is covered by a series of raised floor panels 16 according to the present invention. The floor panels 16 are arranged in an interlocking relationship that is described in more detail below. This interlocking relationship maintains the position of the floor panels 16 upon the base floor 12 and prevents the panels 16 from becoming separated from one another. Each floor panel 16 includes a plurality of perforations 18 that permit the passage of air through each floor panel 16 to dry or cool grain seated atop the floor panels 16. The air is directed to within a plenum between the base floor 12 and the floor panels 16 of the grain bin 10 through a nozzle 20 by a fan 22. The air may be heated by a heater 24.

FIG. 2 is a perspective view of one of the floor panels 16 of FIG. 1. The floor panel 16 may be made of any suitable material, but is preferably made from a single piece of sheet metal. In general, the floor panel 16 is comprised of a female flange 26 that acts as a first support member, a male flange 28 that acts as a second support member, a center support 30, a first grain support surface or floor 32 extending between the female flange 26 and the center support 30, and a second grain support surface or floor 34 extending between the male flange 28 and the center support 30. These different features and regions are described in greater detail below.

The female flange 26 is comprised of a female vertical inner wall 36, a female vertical outer wall 38 and a female horizontal base portion 40 that connects the inner wall 36 to the outer wall 38. The outer wall 38 is further comprised of a lower portion 42 and an upper portion 44. The lower portion 42 extends upward from the base portion 40 at an angle toward the inner wall 36. The upper portion 44 extends upward away from the inner wall 36 and thus extends in the opposite direction that the lower portion 42 extends. Between the lower portion 42 and the upper portion 44 is a transition point 46. The horizontal distance between the transition point 46 and the inner wall 36 is less than the width W of the base portion 40. As described below, these relationships keep the male flange 28 locked within the female flange 26.

The male flange 28 is comprised of a male vertical outer wall portion 48 and a male vertical inner wall portion 50. The outer wall portion 48 and the inner wall portion 50 are connected by a male horizontal base portion 52. The width W' of the male horizontal base portion 52 is less than the width W of the female horizontal portion 40, thus allowing the male flange 28 to be seated within the female flange 26, with the male horizontal portion 52 seated atop the female horizontal portion 40 to link different panels 16 as seen in FIG. 1. The width W' of the male horizontal base portion 52 is greater than the horizontal distance between the transition point 46 and the female vertical wall 36, thus locking the inner wall portion 50 below the transition point 46 and preventing the male flange 28 from being disengaged from the female flange 26 unless enough upward force is applied to force the inner wall portion 50 beyond the transition point 46.

The center support 30 is located between the female flange 26 and the male flange 28. As illustrated, the center support 30 includes a horizontal center support base portion 54. Extending from both sides of the base portion 54 is a first support extension 56 and a second support extension 58. The first support extension 56 and the second support extension 58 both include a support portion, 60 and 62 respectively, and a vertical attachment portion, 64 and 66 respectively. As illustrated, the support base portion 54 and the support portions 60 and 62 are configured to produce a center support 30 shaped as a triangle to provide a support base portion 54 of optimal strength.

With reference to FIG. 3, the two vertical attachment portions 64 and 66 are secured together by one or more stakings 68 to prevent the first support surface 32 from separating from the second support surface 34 to form a gap between the surfaces 32 and 34 through which grain may pass. As seen in FIGS. 3 and 4, each staking 68 includes an aperture 70 and a tab 72. The aperture 70 and the tab 72 are both located opposite one another with either the aperture 70 being located within the vertical attachment portion 66 and the corresponding tab 72 located in the vertical attachment portion 64 as seen at staking 68a, or vice versa as seen at staking 68b.

To provide additional strength to the connection between the vertical attachment portions 64 and 66, placement of the apertures 70 and the tabs 72 may be alternated between the different vertical attachment portions 64 and 66 as seen in FIG. 4. To secure the vertical attachment portions 64 and 66 to one another, the tab 72 is inserted through the aperture 70 and bent back upon itself.

To enhance the strength of the floor panel 16, one or more portions of the floor panel 16 may be corrugated. Preferably, the female vertical inner wall 36, the male vertical inner wall portion 48, the first support extension 56, the second support extension 58, the first support surface 32, and the second support surface 34 are all corrugated. The corrugations may be formed in any suitable manner but are preferably rolled into the sheet metal during manufacturing. A wide variety of different corrugations may be used to strengthen the floor panel 16. For example, as seen in FIGS. 1, 2, 3, and 6, corrugations 74 may be used to strengthen the first support surface 32 and the second support surface 34. The perforations 18 are located within the corrugations 74. As seen in FIG. 2 and FIG. 5, the female vertical inner Wall 36 and the male inner wall portion 48 are strengthened through corrugations 76. Finally, as seen in FIG. 2 and FIG. 3, the first support extension 56 and the second support extension 58 are strengthened through corrugations 78.

FIG. 6 illustrates a piece of sheet metal 80 from which the floor panel 16 is formed. The sheet metal 80 has been processed to include the apertures 70, the tabs 72, the perforations 18, and the corrugations 74, 76, and 78. Further, the metal is bent at hinge points 82 to form the floor panel 16. The different hinge points 82 define the different portions of the floor panel 16 such as the female flange upper portion 44, the female flange base portion 40, the female flange vertical wall 36, the first grain support surface 32, the vertical attachment portions 64 and 66, the second grain support surface 34, the support portions 60 and 62, the horizontal center support base portion 54, the male flange inner wall portion 48, the male flange horizontal base portion 52, and the male flange outer wall portion 50. The sheet metal 80 is bent along the hinge points 82 to form the different portions and areas of the floor panel 16.

As seen in FIG. 7, the floor panel 16 is designed to permit easy and compact stacking for shipping and/or storage. The floor panels 16 are preferably stacked atop each other such that neighboring panels 16 are positioned in an inverse relationship to each other with the support surfaces 32 and 34 of the neighboring panels 16 contacting each other. Further, the neighboring panels 16 are rotated at 180° to each other to provide clearance between the center supports 30. That is, the first support member, second support member, and center support are spatially configured such that neighboring pairs of floor panels can be nested within one another in an inverse 180° relationship while maintaining substantially the same horizontal and vertical dimensions. The compact stacking of the floor panels 16 is further aided by the planar support surfaces 32 and 34. The planar surfaces 32 and 34 permit neighboring floor panels 16 to be placed closer together than if the surfaces 32 and 34 were bowed.

It must be noted that many modifications can be made to the embodiments described above. For example, although it is preferred that the center support 30 be shaped as a triangle, the center support 30 may be configured to resemble any suitable shape capable of providing sufficient strength to the floor panel 16, such as an inverse "T", a wide or narrow loop, a diamond, or a square. Further, while FIG. 4 illustrates the different tabs 72a and 72b as bending in the same direction, it must be noted that the tabs 72a and 72b may be bent in opposite directions to provide added lateral strength to the connection between the vertical attachment portions 64 and 66.

The description of the invention is merely exemplary in nature and, thus, variations that do not depart from the gist of the invention are intended to be within the scope of the invention. Such variations are not to be regarded as a departure from the spirit and scope of the invention. Further, while the description makes reference to "first" and "second" elements, these terms are used to simply differentiate between two like elements and do not relate to the importance of the elements or the order of the elements.

What is claimed is:

1. A grain bin floor panel formed from sheet material, said grain bin floor panel comprising:
   a unitary piece of sheet metal having a substantially uniform thickness formed into a three dimensional panel including:
   a first support member;
   a second support member;

a center support disposed between said first support and said second support, said center support connected to said first support by a first floor surface and to said second support by a second floor surface, said center support comprised of:
  a first vertical attachment portion having a first plurality of alternating interlocking members and cooperating interlocking members associated with a surface thereof;
  a second vertical attachment portion having a second plurality of alternating interlocking members and cooperating interlocking members associated with a surface thereof, said first and second pluralities of interlocking members and cooperating interlocking members operating to secure the surfaces of said first and second attachment portions against relative movement and to form a double wall; and
a plurality of perforations formed throughout said first floor surface and said second floor surface, said perforations being sufficient to minimize spoilage of grain resting on the grain bin floor panel.

2. The grain bin floor panel of claim 1, wherein said first support member has a vertical side wall with corrugations to provide additional support to said floor panel.

3. The grain bin floor panel of claim 1, wherein said first support member comprises:
  a horizontal base portion for supporting said floor panel on a substantially planar surface;
  a vertical inner wall portion connecting said horizontal base portion to said first floor surface; and
  a vertical outer wall portion extending from a side of said horizontal base portion opposite said vertical inner wall portion, said vertical outer wall portion tapered inward toward said vertical inner wall portion.

4. The grain bin floor panel of claim 1, wherein said second support member comprises:
  a horizontal base portion for supporting said floor panel on a substantially planar surface;
  a vertical outer wall connecting said horizontal base portion to said second floor surface; and
  a vertical inner wall extending from a side of said horizontal base portion opposite said vertical outer wall.

5. The grain bin floor panel of claim 1, wherein said second support member has a vertical side wall with corrugations to provide additional support to said floor panel.

6. The grain bin floor panel of claim 1, wherein said center support further comprises:
  a horizontal center support base portion
  a first center support portion extending from said horizontal support base portion upward toward said first vertical attachment portion and said first and second floor surfaces; and
  a second center support portion extending from said horizontal support base portion upward toward said second vertical attachment portion and said first and said second floor surfaces;
  wherein the combination of said horizontal center support base portion, said first center support portion, and said second center support portion are positioned in a triangular shape, and said first and second vertical attachment portions are disposed adjacent one another to form a double wall.

7. The grain bin floor panel of claim 1, wherein said first floor surface and said second floor surface extend within a single horizontal plane.

8. The grain bin floor panel of claim 1, wherein said sheet material is metal.

9. The grain bin floor panel of claim 1, wherein said first floor surface and said second floor surface have corrugations.

10. A grain bin floor panel formed from sheet material, said grain bin floor panel comprising:
  a first support member;
  a second support member; and
  a center support disposed between said first support member and said second support member, said center support connected to said first support by a first floor surface and to said second support by a second floor surface, said center support comprising:
    a horizontal center support base portion for supporting said floor panel on a substantially planar surface;
    a first angled center support portion extending from said horizontal base portion upward toward said first and second floor surfaces;
    a second angled center support portion extending from said horizontal base portion upward toward said first and second floor surfaces; and
    a plurality of perforations formed within at least one of said first floor surface and said second floor surface;
    wherein the combination of said horizontal base portion, said first support portion, and said second support portion have a triangular shape;
  further wherein at least one of said first and second angled center support portions has a plurality of adjacent corrugations to provide additional support to said respective floor panel.

11. The grain bin floor panel of claim 10, wherein said center support further comprises:
  a first attachment portion having an interlocking member associated with a surface thereof; and
  a second attachment portion having a cooperating interlocking member associated with a surface thereof, said interlocking member and said cooperating interlocking member operating to secure said first and second attachment portions together.

12. The grain bin floor panel of claim 10, further comprising a plurality of perforations formed within said first floor surface and said second floor surface.

13. The grain bin floor panel of claim 10, wherein said first support member comprises:
  a horizontal base portion for supporting said floor panel on a substantially planar surface;
  a vertical inner wall portion connecting said horizontal base portion to said first floor surface; and
  a vertical outer wall portion extending from said horizontal base portion, said vertical outer wall portion tapered inward toward said vertical inner wall portion.

14. The grain bin floor panel of claim 10, wherein said second support member comprises:
  a horizontal base portion for supporting said floor panel on a substantially planar surface;
  a vertical outer wall connecting said horizontal base portion to said second floor surface; and
  a vertical inner wall extending from a side of said horizontal base portion opposite said vertical outer wall.

15. The grain bin floor panel of claim 10, wherein at least one of said first and second support members has a vertical side wall with corrugations to provide additional support to said floor panel.

16. The grain bin floor panel of claim 10, wherein said first floor surface and said second floor surface are positioned within a single horizontal plane.

17. The grain bin floor panel of claim 10, wherein said first floor surface and said second floor surface have corrugations.

18. A grain bin floor assembly formed from sheet material, said grain bin floor assembly including a plurality of floor panels, each floor panel comprising:
- a first support member;
- a second support member; and
- a center support disposed between said first support member and said second support member, said center support connected to said first support member by a first floor surface and to said second support member by a second floor surface; said center support comprising:
  - a horizontal center support base portion having a substantially planar surface;
  - a first center support portion extending from said horizontal base portion upward toward said first and second floor surfaces; and
  - a second center support portion extending from said horizontal base portion upward toward said first and second floor surfaces;
  - wherein upper ends of said first and second center support portions are disposed adjacent one another to form a double wall;
- wherein said first support member, second support member, and center support are spatially configured such that neighboring pairs of floor panels can be nested within one another in an inverse 180° relationship and said nested floor panels maintaining substantially the same horizontal and vertical dimensions as a single floor panel;
- the grain bin floor assembly further comprising a plurality of perforations formed within said first floor surface and said second floor surface.

19. The grain bin floor assembly of claim 18, wherein said center support further comprises:
- a first attachment portion having an interlocking member associated with a surface thereof; and
- a second attachment portion having a cooperating interlocking member associated with a surface thereof, said interlocking member and said cooperating interlocking member operating to secure said first and second attachment portions together.

20. The grain bin floor assembly of claim 18, wherein said first support member comprises:
- a horizontal base portion having a substantially planar surface;
- a vertical inner wall portion connecting said horizontal base portion to said first floor surface; and
- a vertical outer wall portion extending from said horizontal base portion, said vertical outer wall portion tapered inward toward said vertical inner wall portion.

21. The grain bin floor assembly of claim 18, wherein said second support member comprises:
- a horizontal base portion having a substantially planar surface;
- a vertical outer wall connecting said horizontal base portion to said second floor surface; and
- a vertical inner wall extending from a side of said horizontal base portion opposite said vertical outer wall.

22. The grain bin floor assembly of claim 18, wherein said first floor surface and said second floor surface are positioned within a single horizontal plane.

23. The grain bin floor assembly of claim 18, wherein said sheet material is sheet metal.

24. The grain bin floor assembly of claim 18, wherein said first floor surface and said second floor surface have corrugations.

25. The grain bin floor assembly of claim 18, wherein said first floor surface has corrugations extending substantially its entire length.

26. The grain bin floor assembly of claim 18, wherein said second floor surface has corrugations extending substantially its entire length.

27. The grain bin floor assembly of claim 18, wherein said first and second support members have vertically extending corrugated side walls, and said center support has at least one extending corrugated side support extension.

28. A grain bin floor system comprising:
- a grain bin;
- a plurality of individual grain bin floor panels, each said floor panel being formed from a folded sheet of metal and having:
  - a first support member having a vertically extending corrugated side wall;
  - a second support member having a vertically extending corrugated side wall; and
  - a center support disposed between said first support and said second support, said center support connected to said first support by a first floor surface and to said second support by a second floor surface, said center support comprised of:
    - a first vertical attachment portion having an interlocking member associated with a surface thereof;
    - a second vertical attachment portion having a cooperating interlocking member associated with a surface thereof, said interlocking member and said cooperating interlocking member operating to secure the surfaces of said first and second attachment portions against relative movement and to form a double wall;
    - a horizontal center support base portion having a substantially planar surface; and
    - first and second corrugated center support portions extending from said horizontal base portion to said double wall and positioned in a triangular shape;
- wherein any combination of said first support member, said second support member and said center support cooperate to define a plenum for passage of air.

29. The grain bin floor system of claim 28 wherein said center support is integral with at least one of said first floor surface and said second floor surface.

* * * * *